(12) United States Patent
Obermann

(10) Patent No.: US 8,597,773 B2
(45) Date of Patent: Dec. 3, 2013

(54) DECORATIVE ELEMENT AND PLASTIC PART PROVIDED WITH A DECORATIVE ELEMENT

(75) Inventor: Friedrich Obermann, Waldneukirchen (AT)

(73) Assignee: Burg Design GmbH (AT)

( * ) Notice: Subject to any disclaimer, the term of this patent is extended or adjusted under 35 U.S.C. 154(b) by 546 days.

(21) Appl. No.: 10/492,787

(22) PCT Filed: Oct. 15, 2002

(86) PCT No.: PCT/EP02/11508
§ 371 (c)(1),
(2), (4) Date: Jun. 10, 2004

(87) PCT Pub. No.: WO03/033306
PCT Pub. Date: Apr. 24, 2003

(65) Prior Publication Data
US 2005/0181184 A1    Aug. 18, 2005

(30) Foreign Application Priority Data
Oct. 16, 2001    (AT) ............................. A 1642/2001

(51) Int. Cl.
*B41M 5/00*    (2006.01)
(52) U.S. Cl.
USPC ......... 428/195.1; 428/203; 156/245; 264/132
(58) Field of Classification Search
USPC ................. 264/132; 428/195.1, 203; 156/245
See application file for complete search history.

(56) References Cited

U.S. PATENT DOCUMENTS

| 4,596,190 | A | * | 6/1986 | Hanstein et al. | 101/470 |
| 4,994,224 | A | * | 2/1991 | Itoh et al. | 264/247 |
| 5,270,097 | A | | 12/1993 | Ishii et al. | |
| 5,296,340 | A | * | 3/1994 | Tsukada et al. | 430/394 |
| 5,656,362 | A | * | 8/1997 | Abrams | 428/200 |
| 6,089,614 | A | * | 7/2000 | Howland et al. | 283/91 |
| 6,170,881 | B1 | * | 1/2001 | Salmon et al. | 283/91 |
| 6,304,430 | B1 | * | 10/2001 | Laine et al. | 361/625 |
| 6,411,029 | B1 | * | 6/2002 | Czak | 313/509 |
| 6,416,866 | B1 | * | 7/2002 | Atake et al. | 428/424.8 |
| 6,548,128 | B2 | * | 4/2003 | Auld et al. | 428/13 |
| 6,790,396 | B2 | * | 9/2004 | Eiden et al. | 264/132 |
| 6,790,525 | B2 | * | 9/2004 | Takeuchi et al. | 428/339 |
| 6,875,301 | B2 | * | 4/2005 | Kauppi et al. | 156/245 |

FOREIGN PATENT DOCUMENTS

| DE | 297 21 627 | 2/1998 |
| JP | 63 087342 | 4/1988 |
| JP | 03 157237 | 7/1991 |
| JP | 10 287190 | 10/1998 |

OTHER PUBLICATIONS

International Search Report dated Feb. 12, 2003.

* cited by examiner

*Primary Examiner* — D. Lawrence Tarazano
*Assistant Examiner* — Tamra L Dicus
(74) *Attorney, Agent, or Firm* — Ostrolenk Faber LLP

(57) ABSTRACT

A preformed decorative element, which can be injection-overmolded with a plastic material and comprises a transparent plastic foil, on which a decoration is printed. The foil is provided, at least partially on both sides, with a non-surface-covering decoration, the decoration on the inner side being printed with a surface-covering color coating layer.

27 Claims, 1 Drawing Sheet

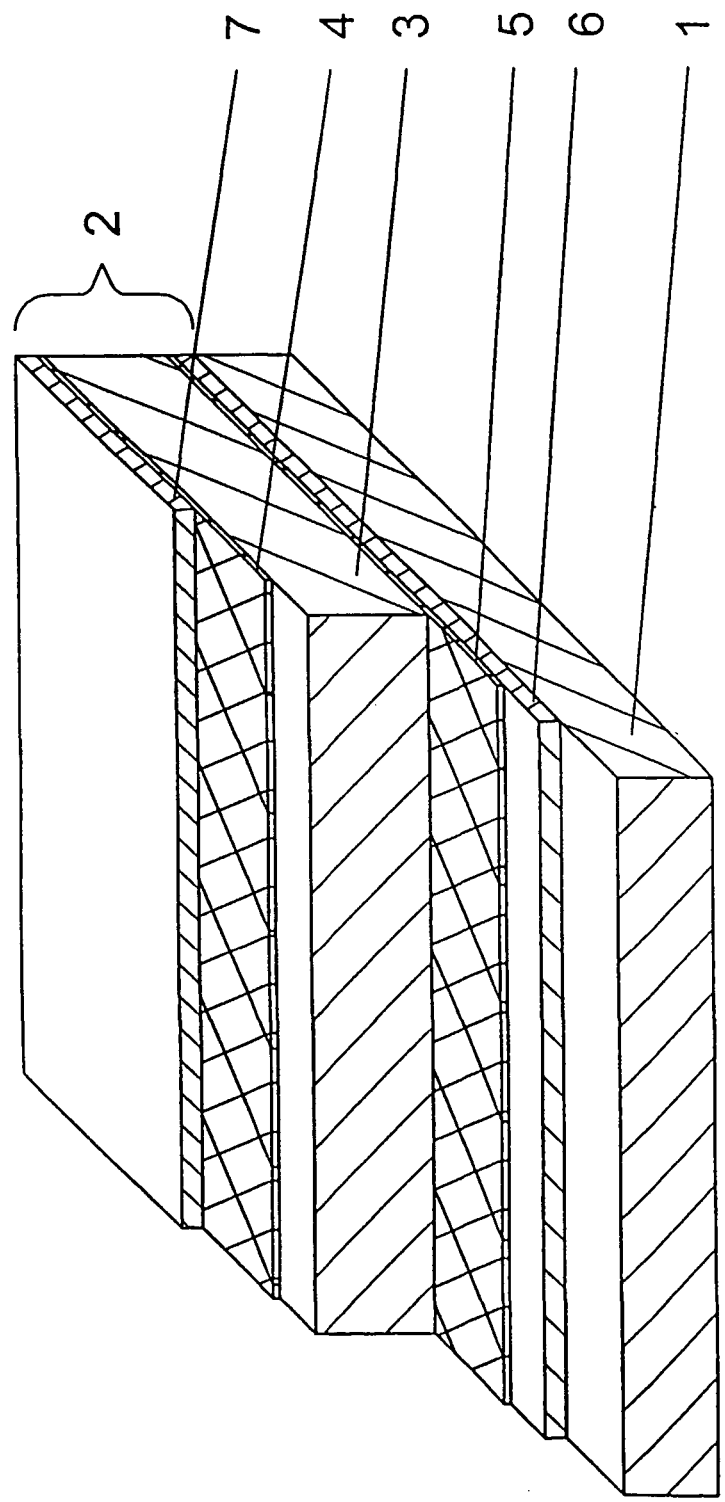

DECORATIVE ELEMENT AND PLASTIC PART PROVIDED WITH A DECORATIVE ELEMENT

BACKGROUND OF THE INVENTION

1. Field of the Invention

The invention relates to a preformed decorative element, which can be injection-overmolded with a plastic material and comprises a printed, transparent or translucent plastic foil. The invention furthermore relates to a plastic part which is provided with a decorative element and is produced by injection-overmolding.

2. Related Art

It is known, for the decoration of plastic parts, for example also for the decoration of interior equipment parts of motor vehicles, to use decorative elements which are applied to the surfaces to be decorated and have a foil which is printed with a decoration either on its outer side or its inner side. The application can take place by bonding the decorative elements over the entire surface, in which case the external appearance which can be obtained in this manner is often not very satisfactory. The application of the decorative elements, particularly in the case of surfaces which are designed with a severe curvature or irregularly, is difficult. For this reason, it has therefore often not been attempted to make diverse objects or parts thereof more attractive with the use of such decorative elements.

Although, when carefully produced, decorative elements which are integrated by injection-overmolding during the production of a plastic component do have a better external appearance, the production of the parts is technically more complex. The decorative effect of decorative elements connected in such a manner to the part concerned corresponds to that of bonded decorative elements. There is now frequently the desire to have available decorative elements which are designed or can be designed to be visually more attractive, so that the complexity of the production due to the injection overmolding process is worthwhile. In addition, there is the desire to connect the aesthetic effect of decorative elements with a functional effect, for example, to emphasize regions where operating elements or the like are accommodated in the plastic part.

SUMMARY OF THE INVENTION

The invention is therefore based on the object of providing a decorative element which can be designed to be visually substantially more attractive than the known decorative elements, and which satisfies the above-mentioned needs and requirements.

The object which is set is achieved according to the invention by the foil being provided on both sides with a non-surface-covering decoration, the decoration on the inner side of the foil additionally being printed with a surface-covering color coating layer.

According to the invention, the decorative element can therefore be designed in diverse ways such that its decoration develops a visually very attractive depth effect for the observer; in particular, the decoration can have a three-dimensional effect which very greatly exceeds the actual depth dimension of the printed plastic foil. Decorative elements designed in accordance with the invention can be configured in such a manner that, depending on the environmental light or illumination, reflections and shade effects occur, which have the effect that the decorative element remains readily visible even under unfavorable light conditions. Decorative elements designed in accordance with the invention can be readily connected to a plastic part by injection-overmolding, thus resulting in a multiplicity of ranges of application.

According to a preferred embodiment of the invention, the decorative element is designed in such a manner that the color coating layer comprises at least one color or shade of color differing from the decoration on the inner side. This enables a particularly effective contrasting effect to be produced.

One particularly significant three-dimensional effect can be obtained if the decoration on the outer side at least substantially corresponds with the decoration on the inner side.

The three-dimensional effect can furthermore be reinforced according to the invention by the decoration on the outer side being slightly offset with respect to the decoration on the inner side.

Particularly clear light/shade effects and also reflection effects can be obtained in a variant in which the decoration on both sides is composed at least substantially of geometrical and, in particular, similar structures. It is precisely such embodiments which are advantageous in the case of applications which certain regions having operating elements or the like are to be emphasized.

In this case, patterns which are composed of n-corners where n≥3, of circles, ellipses, lines or the like, are visually particularly attractive and pleasing to the observer.

As an alternative or in addition, the decoration applied on the inner side and on the outer side of the foil of the decorative element may also consist of letters and/or figures. Accordingly, decorative elements may also be used for labeling components, operating elements and the like.

The foil which is present in the decorative element and is printed on both sides consists, in particular, of polycarbonate or polymethylmethacrylate. These materials are particularly durable, light-resistant and transparent, which makes them particularly suitable for use in decorative elements.

The thickness of the foil, which is printed on both sides, has a certain influence on the depth effect which can be obtained and is also coordinated with the selected decoration. Foils which have a thickness of 0.2 to 2 mm are particularly suitable.

For certain ranges of application, it may furthermore be advantageous if the decorative element is also particularly abrasion-resistant and insensitive to moisture. It may therefore be favorable if the outer side of the decorative element is provided with a protective layer of a transparent plastic foil which can be laminated on to the foil of the decorative element. A particularly suitable material for the protective layer is polymethylmethacrylate having a foil thickness of 50 to 500 μm.

BRIEF DESCRIPTION OF THE DRAWINGS

Further features, advantages and details of the invention will now be explained in greater detail with reference to the drawing which schematically shows an exemplary embodiment of the invention. In this case, FIG. 1 shows an oblique view of a detail of a plastic part provided with a decorative element, designed in accordance with the invention.

DETAILED DESCRIPTION

FIG. 1 shows only a small detail of a plastic part 1 which is provided with a decorative element 2, here in the form of a strip, which ends with the upper side of the part 1 in particular in a flush manner. The decorative element 2 comprises a transparent, but at least translucent plastic foil 3 which is provided on both sides with a decoration 4, 5 by means of silk screen printing. The decoration 4, 5 is formed by a non-surface-covering pattern by the color which is printed on surrounding or tracing the selected structures. Only a small part of the outer side and inner side of the foil 3 is therefore covered with the pattern. The decoration 5 applied to the inner side of the foil 3 is additionally completely covered with a coating layer 6 of colored material. The coating layer 6 is produced either from the color or one of the colors used for the decoration 5 from a color or shade of color differing from the decoration 5 on the inner side.

In the case of the variant shown in FIG. 1, the decoration 4 on the outer side is a grid of squares. The decoration 5 applied on the inner side is a correspondingly designed grid which, in particular, is applied offset with respect to the grid on the outer side. The offset can take place, for example, in the diagonal direction. The decoration 4 applied to the outer side of the foil 3 is covered with a transparent protective layer 7 which is laminated on with the aid of a bonding agent, for example a hot-melt adhesive. Depending on the requirements made on the part 1, for example, in respect of abrasion resistance, the protective layer 7 may also be omitted.

The decorative element 2 designed in such a manner has a pleasing and very attractive depth effect for the observer, the effect being attributable, in particular, to the corresponding decoration 4, 5 on the inner side and outer side of the foil 3 and to the production of shading effects of the decoration 4 situated on the outer side on the decoration 5 situated on the inner side or on the coating layer 6 applied there. A mutual offset of the decoration 4 from the decoration 5 reinforces this effect. The colors selected for the decoration 4 on the inner side, the decoration 5 on the outer side and the coating layer 6 may also have an influence on the effect which can be obtained. It is thus advantageous, for example, if the color which is used for the decoration 4 on the outer side has a somewhat darker shade of color than the color used for the decoration 5 on the inner side. The shade of color of the coating layer 6 may also act in a manner reinforcing the effect, for example, if it is substantially brighter than the shade of color for the decoration 5.

Geometrical structures, such as the structure illustrated in FIG. 1, help to make it possible, in the case of different light conditions—sunshine or artificial illumination—for light and shade effects to be produced which render the decorative element 2 particularly readily visible. In this case, the effect can arise of the decorative element 2 being very readily visible in a very bright environment, in daylight and sunshine, and/or the effect of the decorative element 2 remaining readily visible in poorer light conditions, for example, at night or in poor illumination.

To produce the decorative element 2, use is made, in particular, of a foil 3 of polycarbonate or polymethylmethacrylate having a thickness of 0.2 to 2 mm. The designated decoration is applied on both sides of the foil by silk screen printing. The foil 3 which is printed on both sides is dried and dehydrated. Then, if required, the transparent protective layer 7 is laminated on to the outer side of the foil 3. The protective layer 7 consists, in particular, of PMMA (polymethylmethacrylate) and has a constant thickness which can be between 50 and 500 μm. The foil 3 processed in such a manner is then thermally deformed in order to adapt it to the part 1. The deformation can take place in a known manner by deep drawing under vacuum. The shaped part produced in such a manner is punched to correspond to the contours of the finished part, the decorative element 2.

The decorative element 2 which is now finished is matched in its dimensions to the injection molding die so that it is not damaged when placed into the injection mold. In order to produce the plastic part concerned, the decorative element 2 is placed into the open injection mold, the mold is closed and the decorative element 2 is injection-overmolded by plastic material being injected. The injection geometry ensures that the decorative element 2 comes into contact with the introduced plastic material in a gentle manner in order to avoid damage during the injection-overmolding process. The finished plastic part 1 is removed from the injection molding die and further processed or joined together with the end product, as designated.

The invention enables a multiplicity of plastic parts having decorative elements which have a pleasing and visually very attractive depth effect to be produced. As a result of their configuration according to the invention, these parts can not only have a very attractive effect, but also can take on the function of visually emphasizing certain regions, components, operative elements and the like. This can be the case in particular in facings or coverings, for example, in order to arrange operating elements which are fixed there, such as flip switches or the like, more conspicuously. This may make it easier for the user to find the operating elements even in unfavorable light conditions. Decorative elements of occasional design can be placed into the injection mold provided for a certain part. This opens up the possibility of offering customers a multiplicity of different decorations for selection.

Of course, the production of the decorative elements 2 is not restricted to certain shapes, colors or decorative structures. The decorative elements 2 can be produced in a multiplicity of molds, for example, even with recesses or openings. There are also virtually no restrictions in respect of the colors used and the possible patterns. Particularly good depth effects can be obtained with geometrical patterns using triangles, rectangles, circles, lines and the like as basic elements; however, signatures, letters, figures, etc. are also readily suitable.

The parts which can be produced according to the invention include a multiplicity of objects and products and also components thereof, which cannot be listed in full, such as interior or exterior equipment parts of motor vehicles or components of such equipment parts, for example trim strips, trim panels or facings which can be used in the region of vehicle doors, the instrument panel, the central console and the like, and furthermore housings or housing parts of printers, viewing screens or of diverse appliances which can be used in the domestic sphere.

The invention claimed is:

1. A preformed decorative element for being injection-overmolded with a plastic material, the preformed decorative element comprising:
   a transparent or translucent plastic foil having an outer side and an inner side, the plastic foil being at least partially coated on both the outer side and the inner side with a non-surface-covering surface decoration;
   the non-surface-covering surface decoration on the inner side being covered with a surface-covering color coating layer; and
   the decoration on the outer side being identical to the decoration on the inner side and slightly offset with respect to the decoration on the inner side so as to provide a three-dimensional visual effect for the decoration.

2. The decorative element as claimed in claim 1, the surface decoration having a pattern composed of geometrical structures.

3. The decorative element as claimed in claim 2, the pattern including n-corners, where $n \geq 3$.

4. The decorative element as claimed in claim 1, the surface decoration including letters and/or figures.

5. The decorative element as claimed in claim 1, the foil being printed on both sides comprising polycarbonate or polymethylmethacrylate.

6. The decorative element as claimed in claim 1, the foil having a thickness of 0.2 to 2 mm.

7. The decorative element as claimed in claim 1, the outer side of the foil being covered with a protective layer of a transparent or translucent plastic foil.

8. The decorative element as claimed in claim 7, the protective layer being laminated on.

9. The decorative element as claimed in claim 7, the protective layer being a foil of polymethylmethacrylate.

10. The decorative element as claimed in claim 7, the foil for the protective layer having a thickness of 50 to 500 μm.

11. The decorative element as claimed in claim 1, being formed by deep drawing under vacuum.

12. A plastic part provided with a decorative element by injection overmolding, the decorative element comprising:

a transparent or translucent plastic foil with an outer side and an inner side, the plastic foil being at least partially coated on both the outer side and the inner side with a non-surface-covering surface decoration;

the decoration on the inner side being covered with a surface-covering color coating layer; and the decoration on the outer side being identical to the decoration on the inner side and slightly offset with respect to the decoration on the inner side so as to provide a three-dimensional visual effect for the decoration.

13. The plastic part as claimed in claim 12, the surface decoration having a pattern composed of geometrical structures.

14. The plastic part as claimed in claim 13, the pattern including n-corners, where n≥3.

15. The plastic part as claimed in claim 12, the surface decoration including letters and/or figures.

16. The plastic part as claimed in claim 12, the foil being printed on both sides comprising polycarbonate or polymethylmethacrylate.

17. The plastic part as claimed in claim 12, the foil having a thickness of 0.2 to 2 mm.

18. The plastic part as claimed in claim 12, the outer side of the foil being covered with a protective layer of a transparent or translucent plastic foil.

19. The plastic part as claimed in claim 18, the protective layer being laminated on.

20. The plastic part as claimed in claim 18, the protective layer being a foil of polymethylmethacrylate.

21. The plastic part as claimed in claim 18, the foil for the protective layer having a thickness of 50 to 500 μm.

22. The plastic part as claimed in claim 12, being formed by deep drawing under vacuum.

23. The decorative element as claimed in claim 2, wherein the pattern is composed of similar structures.

24. The decorative element as claimed in claim 3, wherein the pattern has at least one of circles, ellipses and lines.

25. The plastic part as claimed in claim 13, wherein the pattern is composed of similar structures.

26. The plastic part as claimed in claim 14, wherein the pattern has at least one of circles, ellipses and lines.

27. A plastic part provided with a decorative element by injection overmolding, the decorative element comprising:

a transparent or translucent plastic foil with an outer side and an inner side, the plastic foil being at least partially coated on both the outer side and the inner side with a non-surface-covering surface decoration;

the decoration on the inner side being covered with a surface-covering color coating layer; and the decoration on the outer side comprising a first pattern identical to a second pattern comprised in the decoration on the inner side, the first pattern being slightly offset with respect to the second pattern so as to provide a visual depth effect for the pattern.

\* \* \* \* \*

UNITED STATES PATENT AND TRADEMARK OFFICE
CERTIFICATE OF CORRECTION

PATENT NO.       : 8,597,773 B2                                                          Page 1 of 1
APPLICATION NO. : 10/492787
DATED            : December 3, 2013
INVENTOR(S)      : Friedrich Obermann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 295 days.

Signed and Sealed this
Twenty-second Day of September, 2015

Michelle K. Lee
*Director of the United States Patent and Trademark Office*